(12) United States Patent
Yang et al.

(10) Patent No.: US 11,664,929 B2
(45) Date of Patent: May 30, 2023

(54) TERMINAL, SERVER, INTERNET OF THINGS DATA TRANSMISSION METHOD, AND DATA TRANSMISSION SYSTEM

(71) Applicant: FJ Dynamics Co., Ltd., Shenzhen (CN)

(72) Inventors: Zhong-Yuan Yang, Shenzhen (CN); Di Wu, Nanjing (CN); Yuan Yao, Nanjing (CN); Gao-Dong Wang, Shenzhen (CN)

(73) Assignee: FJ Dynamics Co., Ltd., Shenzhen (CN)

( * ) Notice: Subject to any disclaimer, the term of this patent is extended or adjusted under 35 U.S.C. 154(b) by 0 days.

(21) Appl. No.: 17/366,415

(22) Filed: Jul. 2, 2021

(65) Prior Publication Data

US 2022/0006567 A1 Jan. 6, 2022

(30) Foreign Application Priority Data

Jul. 6, 2020 (CN) .......................... 202010641133.2

(51) Int. Cl.
*H04L 1/00* (2006.01)
*H04L 1/1607* (2023.01)
*H04L 1/18* (2023.01)

(52) U.S. Cl.
CPC .............. *H04L 1/1607* (2013.01); *H04L 1/18* (2013.01)

(58) Field of Classification Search
None
See application file for complete search history.

(56) References Cited

U.S. PATENT DOCUMENTS

| | | | |
|---|---|---|---|
| 6,587,438 B1* | 7/2003 | Brendel | H04L 1/1858 370/254 |
| 11,044,607 B1* | 6/2021 | Woodhead | H04W 12/08 |
| 2013/0212227 A1* | 8/2013 | Thomas | H04L 65/1069 709/227 |
| 2014/0293993 A1* | 10/2014 | Ryhorchuk | H04L 43/16 370/350 |
| 2014/0362867 A1* | 12/2014 | Tanimoto | H04L 47/30 370/412 |
| 2015/0293712 A1* | 10/2015 | Li | G06F 3/061 711/162 |
| 2017/0237673 A1* | 8/2017 | Law | H04W 4/023 370/338 |
| 2017/0339063 A1 | 11/2017 | Chundury et al. | |

FOREIGN PATENT DOCUMENTS

| | | |
|---|---|---|
| CN | 105611489 | 5/2016 |
| EP | 3389325 | 10/2018 |
| EP | 3389325 A1 | 10/2018 |
| JP | 2002223214 | 8/2002 |

(Continued)

*Primary Examiner* — Gerald A Smarth
(74) *Attorney, Agent, or Firm* — ScienBiziP, P.C.

(57) ABSTRACT

The present disclosure provides a terminal, a server, an Internet of Things data transmission method, and a data transmission system, wherein the Internet of Things data transmission method includes following blocks: transmitting data and uniquely corresponding identity information from a terminal used to collect data to a server, and feeding back, at the server, at least one response signal to the terminal in response to the received data and the identity information.

7 Claims, 4 Drawing Sheets

(56) References Cited

FOREIGN PATENT DOCUMENTS

| | | |
|---|---|---|
| JP | 2008-71157 | 3/2008 |
| JP | 2008071157 | 3/2008 |
| JP | 2010-72776 | 4/2010 |
| KR | 10-2003-0058656 | 7/2003 |
| KR | 1020160083186 | 7/2016 |
| WO | 2010027064 | 3/2010 |
| WO | WO-2017107148 A1 * | 6/2017 ............... H04L 1/12 |
| WO | 2018/164707 A1 | 9/2018 |
| WO | 2018164707 | 9/2018 |

* cited by examiner

TERMINAL, SERVER, INTERNET OF THINGS DATA TRANSMISSION METHOD, AND DATA TRANSMISSION SYSTEM

FIELD

The subject matter relates to data transmission field, and more particularly, to a terminal, a server, an Internet of Things data transmission method, and a data transmission system.

BACKGROUND

The Internet of Things is a network that extends and expands based on the Internet. It is a large network formed by a combination of various types of information sensing devices and the Internet.

Data collection is a basic link in the Internet of Things. A connection between things and things or a connection between people and things needs to rely on data collected by transmitters, and then processing devices make determinations to feed back. In other words, data collection is a data source of data monitoring and intelligent control. In a current Internet of Things technology, a terminal collects data, and then the data is transmitted to a server, and the server performs monitoring, analysis, and summarizing based on the collected data. However, the terminal may not be able to completely send the collected data to the server.

For example, in automatic driving, it is necessary o use the data collected by an agricultural machinery in real time to plan a driving path of the agricultural machinery. In a driving process of the agricultural machinery, an environment or road conditions encountered may be complicated, and signals may be confused or lost due to some reasons during a data transmission process. For the server that needs to plan or manage the agricultural machinery based on received data, cannot judge whether the data is confused or lost, so it may cause image data that was actually collected in a 5th minute, but it is judged to be collected in a 4th minute when the server receives the data. Thus, an error occurred in a subsequent processing.

Measures currently taken are mainly focused on how to enhance a quality of signal transmission to avoid the above-mentioned situations. For example, a frequency or strength of signal transmission can be strengthened so that signals can be transmitted to the server, or some anti-interference devices can be arranged so that signals can be disturbed during a process of transmitting signals. However, the server receiving wrong signals or cannot receive signals, which leads to error processing still exists. The above problems cause serious consequences. For example, the server does not receive the data, but the terminal may directly delete the data in order to ensure an available storage capacity after the data is sent. This causes the data that is transmitted failed disappears because it has not been properly saved, which means that the data will be incomplete.

SUMMARY

A purpose of the present disclosure provides a terminal, a server, an Internet of Things data transmission method, and a data transmission system. By utlizing the Internet of Things data transmission method, the server can know a data transmission status such as whether data is confused or lost.

Another purpose of the present disclosure provides a terminal, a server, an Internet of Things data transmission method, and a data transmission system. By transmitting data from the terminal to the server, the terminal knows a data reception status of the server such as whether the server receives the data. In other words, both the terminal and the server know the data transmission status and the data reception status.

Another purpose of the present disclosure provides a terminal, a server, an Internet of Things data transmission method, and a data transmission system. By utlizing the Internet of Things data transmission method, an interaction between the terminal and the server is not limited to the terminal collecting data, but further includes the data transmission status between each other.

Another purpose of the present disclosure provides a terminal, a server, an Internet of Things data transmission method, and a data transmission system. By utlizing the Internet of Things data transmission method, when the data have been transmitted to the server, the data can be deleted from the terminal.

Another purpose of the present disclosure provides a terminal, a server, an Internet of Things data transmission method, and a data transmission system. By utlizing the Internet of Things data transmission method, the data can be preserved as completely as possible.

Another purpose of the present disclosure provides a terminal, a server, an Internet of Things data transmission method, and a data transmission system. By utlizing the Internet of Things data transmission method, the terminal can transmit identify information matching the data to the server when the terminal transmits the data to the server, such that the server can determine whether the data transmission is normal based on the identify information.

Another purpose of the present disclosure provides a terminal, a server, an Internet of Things data transmission method, and a data transmission system. By utlizing the Internet of Things data transmission method, when the server has received the data, the server sends a response signal corresponding to the identify information of the data to the terminal, such that the terminal can process the data stored in the terminal based on the response signal.

According to an aspect of the present disclosure, the present disclosure provides an Internet of Things data transmission method, including: transmitting data and identify information uniquely corresponding to the data from a terminal used to collect the data to a server; and feeding back, at the server, at least one response signal to the terminal in response to the data and the identify information.

According to an embodiment of the present disclosure, the Internet of Things data transmission method further includes: determining the data transmitted failed based on the response signal; and storing the data transmitted failed in a local database corresponding to the terminal.

According to an embodiment of the present disclosure, the Internet of Things data transmission method further includes: determining the data transmitted failed based on the response signal; and retransmitting the data transmitted failed to the server.

According to an embodiment of the present disclosure, the transmitting the data includes: processing the data based on a preset processing rule and obtaining processed data and the identify information; and transmitting the processed data and the identify information to the server, wherein the processing rule is determined by the server.

According to an embodiment of the present disclosure, before transmitting the data, further includes: regularly triggering the terminal and the server to transmit data between the terminal and the server, wherein data collected by the terminal is stored in a local database.

According to an embodiment of the present disclosure, the identity information includes an unique number corresponding to the data.

According to another aspect of the present disclosure, the present disclosure provides a terminal being communicatively connected to a server, including: a collection module; a processing module, wherein the collection module is communicably connected to the processing module; and a communication module, wherein the collection module collects data, and the processing module generates identify information based on the data by the collection module, the identify information being uniquely corresponding to the data; and the communication module transmits the data and the identity information to the server.

According to an embodiment of the present disclosure, the communication module of the terminal receives response information from the server, the response information is corresponding to the data and the identify information received by the server; the processing module determines the data is transmitted failed based on the response information, and sends an instruction to the communication module to retransmit the data and the identify information to the server.

According to an embodiment of the present disclosure, the communication module of the terminal receives response information from the server, the response information is corresponding to the data and the identify information received by the server; the processing module determines the data is transmitted failed based on the response information, and stores the data to a local database.

According to another aspect of the present disclosure, the present disclosure provides a server being communicatively connected to a terminal, the terminal being used to collect data, the server including: a receiving module; an analysis module; and a feedback module, wherein the receiving module is used to receive the data and identity information uniquely corresponding to the data; the analysis module is communicably connected to the receiving module, and analyzes the data and the identity information to generate a response signal uniquely corresponding to the identify information of the data; the feedback module is communicably connected to the analysis module and feeds back the response signal to the terminal.

According to another aspect of the present disclosure, the present disclosure provides an Internet of Things data transmission system, being transmitting data between a terminal and a server, including: an acquirement module, wherein the acquirement module is used to acquire data collected by the terminal and identity information uniquely corresponding to the data; and a transmission module, wherein the transmission module transmits the data and the identity information to the server.

According to an embodiment of the present disclosure, the Internet of Things data transmission system further including: an execution module, wherein the execution module is communicably connected to the terminal, the execution module processes the data based on a processing rule preset by the sever and generates the identity information, the identify information is sent to the acquirement module.

According to an embodiment of the present disclosure, the Internet of Things data transmission system further including: a response module, wherein the response module is communicably connected to the server, and generates a response signal based on the data and the identify information received by the server, and feeds back the response signal to the sever.

According to an embodiment of the present disclosure, the Internet of Things data transmission system further including: a storage device, wherein the storage device is communicably connected to the execution module; the execution module determines which data is transmitted failed based on the responses signal fed back by the response module; the execution module stores the data transmitted failed in the storage device.

According to an embodiment of the present disclosure, the Internet of Things data transmission system further including: a timer, wherein the tinier is used to regularly trigger the terminal and the server to enable data transmission between each other.

DETAILED DESCRIPTION

Figure 1:
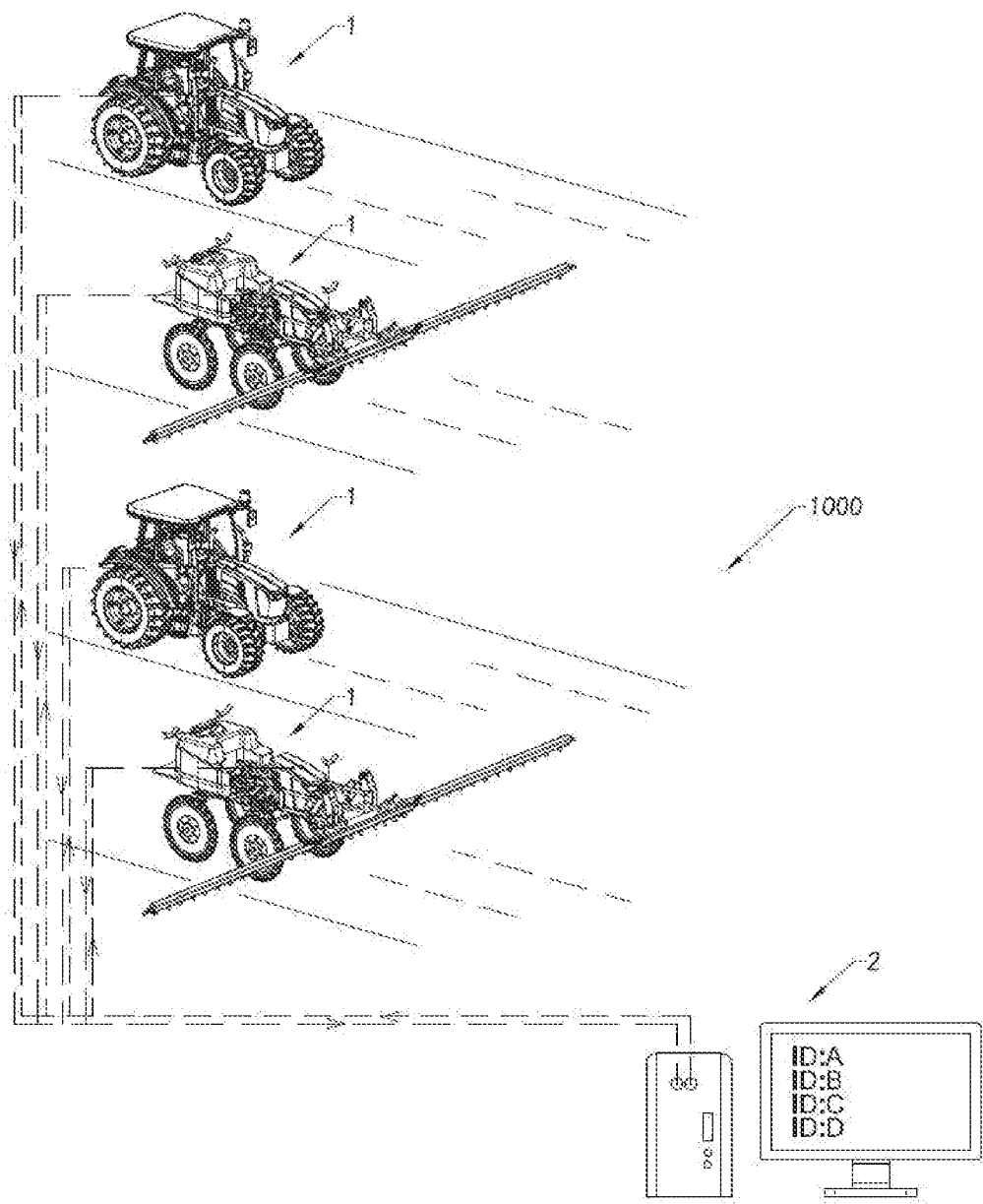
FIG. 1 is an application schematic diagram of an Internet of Things data transmission method according to a preferred embodiment of the present disclosure.

The following description is used to disclose the present disclosure so that those skilled in the art can implement the present disclosure. The preferred embodiments in the following description are only examples, and those skilled in the art can think of other obvious variations. The basic principles of the present disclosure defined in the following description can be applied to other embodiments, modifications, improvements, equivalents, and other technical solutions that do not deviate from the spirit and scope of the present disclosure.

Those skilled in the art should understand that, in the disclosure of the present disclosure, an orientation or a positional relationship indicated by the terms "longitudinal", "lateral", "upper", "lower", "front", "rear", "left", "right", "vertical", "horizontal", "top", "bottom", "inner", "outer", etc. is based on the orientation or the positional relationship shown in the drawings, which is only for the convenience of describing the present disclosure and simplify the description, rather than indicating or implying a device or an element must have a specific orientation, and is constructed and operated in a specific orientation, so the above terms should not be understood as a limitation of the present disclosure.

It can be understood that the term "a" should be understood as "at least one" or "one or more", that is, in one embodiment, the number of a kind of element may be one, and in another embodiment, the number of the kind of element can be more than one, and the term "one" cannot be understood as a restriction on the number.

Figure 2:
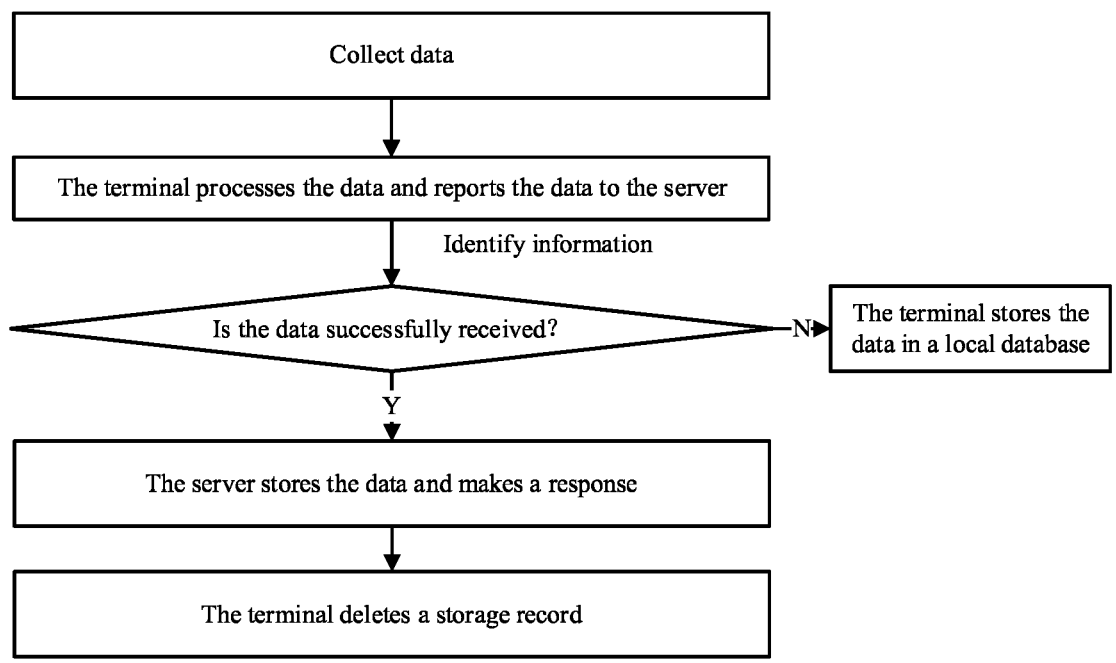
FIG. 2 is a schematic flowchart of the Internet of Things data transmission method according to the above-mentioned preferred embodiment of the present disclosure.

Referring to FIG. 1 to FIG. 2, an Internet of Things data transmission method according to a preferred embodiment of the present disclosure is illustrated.

With the Internet of Things data transmission method, data can be transmitted between at least one terminal 1 and at least one server 2 of an Internet of Things data platform 1000, and it is possible to know whether there is data loss or confusion during a data transmission process, so as to facilitate a processing in follow-up process.

The terminal 1 refers to an end that collects data. The terminal 1 can be a sensor for sensing any of various information, or a device equipped with the sensor for sensing any of various information. The server 2 may be a cloud end. The server 2 may be integrated with a communication component, a storage component and a processing component. The terminal 1 and the server 2 are communicably connected to each other to transfer data between the terminal 1 and the server 2.

It is understandable that a number of the at least one terminal 1 may be multiple. In this embodiment, a plurality of agricultural machineries equipped with sensors for sensing various information are used as terminals 1 as an example for description.

A driver can control a movement such as moving forward or turning of the agricultural machinery, the agricultural machinery which is used as the terminal 1 can record these data, and needs to transmit the data to the server 2. The server 2 needs to save the data for future use, such as for future maintenance.

With the Internet of Things data transmission method, data is transferred from the terminal 1 to the server 2. The Internet of Things data transmission method may include the following blocks:

Obtaining data that needs to be transmitted;

Obtaining identity information matching the data based on the data; and

Transmitting the data and the identity information corresponding to the data to the server 2.

In detail, after the terminal 1 generates or collects the data that needs to be collected, the data needs to be transmitted to the server 2. For the server 2, the server 2 originally does not know a data transmission status of the terminal 1. In other words, an amount of information contained in the data received by the server 2 does not exceed an amount of information contained in the data sent by the terminal 1, and the information may be lost due to various reasons during the data transmission process.

With the identity information, the data that the terminal 1 is trying to send can be known at the server 2. That is to say, for the server 2, the data transmission status of the terminal 1 is no longer unknown, and it can be known by the server 2.

In more detail, the identity information may include a data number, a time of generating a record, a data type, and other information. Based on the identity information, various kinds of data can be uniquely determined. For example, the data number of the identity information can be a unique number.

For example, if the terminal 1 needs to send a string of data, which includes data A, data B, data C, and data. D, under the original technical means, if data loss is occurred during the data transmission process, the server 2 receives the data A and the data C, then the server 2 does not know that the data B has been lost, and does not know that the data B is not received. Similarly, the terminal 1 does not know that the data B is not successfully delivered to the server 2. Unless a user or a background operator compares the data of the terminal 1 with the data of the server 2, it is possible to find that there is data loss. A probability of finding that there is data loss is relatively because the terminal 1 has been always collecting data and a storage time of the data is time-effective. When the user or the background operator finds a problem and manually compares the data, the data of the terminal 1 may no longer exist.

In this embodiment, the terminal 1 transmits the data A, the data B, the data C, and the data A, together with identity information corresponding to each of the data A, the data B, the data C, and the data D. For example, the data A corresponds to a string of code A, the data B corresponds to a string of code B, the data C corresponds to a string of code C, and the data D corresponds to a string of code D. The string of code A corresponding to the data A includes a data number 0001, the string of code B corresponding to the data A includes a data number 0002, the string of code C corresponding to the data A includes a data number 0003, and the string of code D corresponding to the data A includes a data number 0004. If data loss is occurred during the data transmission process from the terminal 1 to the server 2, and the server 2 receives the data A, the data C, and the data D, then the server 2 and the terminal 1 know the data B has been lost based on the identity information corresponding to the data A, the identity information corresponding to the data. C, and the identity information corresponding to the data D. If data confusion is occurred during the data transmission process from the terminal 1 to the server 2, and the server 2 sequentially receives the data A, the data D, the data C, and the data. B, then the server 2 know a correct order of the data A, the data D, the data C, and the data B based on the identity information respectively corresponding to the data A, the data D, the data C, and the data B.

Further, with the Internet of Things data transmission method, not only the server 2 can know a data transmission status, but the terminal 1 can know a data reception status of the server 2.

The Internet of Things data transmission method may further include the following blocks:

Generating, at the server 2, a response signal corresponding to the identity information based on the received data; and Sending the response signal to the terminal 1 for determining whether the data is successfully transmitted.

In detail, it can be seen from the foregoing description that if the data B of the data A, the data B, the data. C, and the data D is lost during the data transmission process, it is difficult for the server 2 and the terminal 1 to find that the data B is lost based on the original technology.

In this embodiment, when the server 2 receives the data A, the data C, and the data D of the data A, the data B, the data C, and the data D, and receives the identity information respectively corresponding to the data A, the data C, and the data D, the server 2 sends, the terminal 1, the response signal in response to the identity information corresponding to the received data, thereby the terminal 1 can know the data transmission status.

In detail, when the server 2 receives the data A, the data C, and the data D, and receives the identity information respectively corresponding to the data A, the data C, and the data D, the server 2 can generate a response signal corresponding to the identity information of the data A, another response signal corresponding to the identity information of the data C, and another response signal corresponding to the identity information of the data D. Such as the server 2 can generate the response signal corresponding to the identity information of the data A by adding a string of characters after the code of the identity information corresponding to the data A; generate the response signal corresponding to the identity information of the data C by adding a string of characters after the code of the identity information corresponding to the data C; and generate the response signal corresponding to the identity information of the data D by adding a string of characters after the code of the identity information corresponding to the data D. Then the server 2 sends the response signals to the terminal 1.

The terminal 1 recognizes the response signals to determine which of the data is successfully transmitted to the server 2. For example, the terminal 1 determines that the data A, the data C, and the data D are successfully transmitted to the server 2 based on the codes of the identity information.

Based on this determination result, the terminal 1 can delete the data A, the data C, and the data D stored in the terminal 1, thereby freeing up storage space. It is worth noting that since the terminal 1 can know the transmission result, because the terminal 1 can know that the data B has not been successfully transmitted, the terminal 1 can take remedial measures for the data B.

In detail, the Internet of Things data transmission method further includes the following blocks:

Retransmitting the data to the server 2 if the data is not successfully transmitted from the terminal 1 to the server 2.

For example, if analysis of the response signal from the server 2 received by the terminal 1 shows that the data B has not been successfully transmitted, the terminal 1 may try to transmit the data B and the identity information corresponding to the data B to the server 2 again, until the data B is successfully transferred. Of course, when a number of times of transmitting the data B exceeds a certain value, the retransmitting of the data B can also be stopped.

The Internet of Things data transmission method may further include the following blocks:

Storing the data in a local database if the data is not successfully transmitted from the terminal 1 to the server 2.

In detail, the data which is transmitted failed is stored in the local database can be waited to be transmitted for a next time or to be read the next time. The data transmitted to the server can be stored in the server, thereby ensuring an integrity of the data, and without excessively occupying a storage space of the terminal 1.

Further, it is worth noting that the terminal 1 and the server 2 are communicably connected to each other, which does not mean that the terminal 1 and the server 2 need to be communicatively connected at all times. A connection between the terminal 1 and the server 1 can be established according to demand. For example, when the terminal 1 needs to transmit data to the server 2, the terminal 1 and the server 1 2 establish a communication connection.

Furthermore, it is worth noting that, by using the Internet of Things data transmission method, the collected data can be preserved as completely as possible. In detail, in the above description, the collected data includes the data A, the data B, the data C, and the data D. In the original technology, if the data B is lost, because the data B is not received at the server 2, then the data. B cannot be obtained by the server 2, and for the terminal 1, an amount of collected data is increasing, and a storage capacity is limited. Therefore, the data B may be cleared after a period of time, thus the data B is extremely likely to be permanently lost. In this embodiment, the server 2 can know that the data B is lost, and the terminal 1 can also know that the data B has not been successfully transmitted, then the data B can be stored in the local database, and can avoid being cleaned up, and the data A, the data C, and the data D the data that are successfully transmitted may be stored in the server 2. In this way, the collected data is preserved as completely as possible.

Further, it is worth noting that in this embodiment, the data collected at the terminal 1 can be processed and sent to the server 2 in real time. The server 2 may define a data reporting interface, which may include core fields: a filed for reporting the data number (unique), a filed for reporting the data type, a filed for reporting data entity, a filed for reporting the time of generating a record, etc. The terminal 1 processes the collected data with standardized processing to generate the data and the identity information meeting reporting rules.

It is understandable that with the Internet of Things data transmission method, not only the data can be reported to the server 2 in real time, but also offline data can be transmitted to the server 2.

Figure 3:
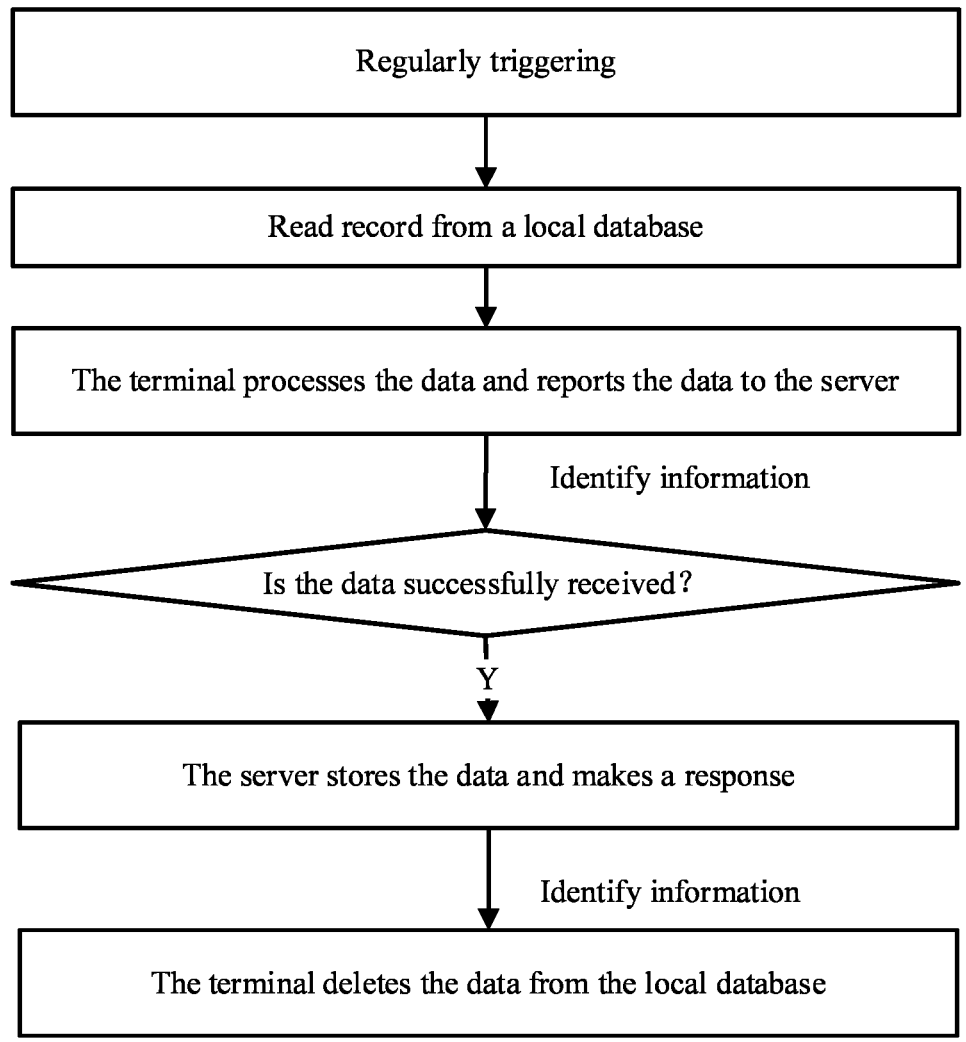
FIG. 3 is another schematic flowchart of the Internet of Things data transmission method according to the above-mentioned preferred embodiment of the present disclosure.

Referring to FIG. 3, in detail, the Internet of Things data transmission method may include the following blocks:

Regularly triggering the terminal 1 to connect to the server 2 by a timer;

Reading data from the local database;

Obtaining identity information that matches the data based on the data; and

Transmitting the data and the identity information corresponding to the data to the server 2.

It is understandable that the data stored in the local database may be the data collected by the terminal 1 that has not been transmitted, or the data that has been transmitted failed by the terminal 1. With the timer, data can be transmitted between the terminal 1 and the server 2 at a fixed time, not at real-time. Whether or not to transmit data in real time or delay transmission of the data can be determined based on a data type of the data. For some non-urgent data, the transmission can be arranged in a unified manner to facilitate centralized processing and shorten a communication time between the terminal 1 and the server 2.

Similarly, the data read from the local database can be processed and transmitted to the server 2. Take the data A, the data B, and the data C as examples for description. The data A, the data B, and the data C are stored in the local database. The timer triggers the terminal 1 connecting to the server 2 at a predetermined time, so that the terminal 1 starts to transmit the data to the server 2. The data A, the data B, and the data. C and the corresponding identity information, such as the code A, the code B, and the code C, are simultaneously transmitted to the server 2.

It is understandable that the processing of the data A, the data B, and the data C to generate the identity information may be executed before or after the terminal 1 and the server 2 are triggered by the timer.

After the server 2 receives the data and the identity information, whether there is data loss can be determined based on the identity information. For example, the identity information received by the server 2 includes the code 0001 and the code 0003, then the server 2 can know that the data including the code 0002 was lost in this transmission.

Further, the server 2 sends the corresponding response signal to the terminal 1 based on the data and the identity information, so that the terminal 1 can know which data is successfully transmitted. For the data that is successfully transmitted, it can be deleted in the local database to free up the storage space.

Further, in the above example, whether it is a real-time data transmission process or a timed data transmission process, the data A, the data B, and the data C in the plurality of data may respectively correspond to the identity information, such as the code A, the code B, and the code C.

It is understandable that one identity information may correspond to at least one of the plurality of data, and one identity information may correspond to a plurality of data.

For example, the terminal 1 needs to transmit six data in a data transmission process, and the six data includes the data A, the data B, the data C, the data D, a data E, a data F, a data G, a data H, and a data I.

The data A, the data B, and the data C may correspond to one identity information such as code one. The data D, the data E, and the data F may correspond to one identity information such as code two. The data G, the data H, and the data I may correspond to one identity information such as code three.

During the data transmission process, the data A, the data B, the data C, and the code one are transmitted to the server 2 together. The data D, the data E, the data F, and the code two are transmitted to the server 2 together. The data G, the data H, the data I, and the code three are transmitted to the server 2 together.

The server 2 can determine that the data corresponding to the identify information 0002 is lost based on the received data and the identity information such as the identity information that contains 0001 and the identity information that contains 0003.

It is worth noting that even if the data is received, but the identity information corresponding to the data is not received, it can be determined that the data is lost during the data transmission process, and the data transmission process is considered a failure.

According to another aspect of the present disclosure. The Internet of Things data transmission method provided by the present disclosure includes the following blocks:

Retransmitting the data to the server 2 when the data is transmitted failed between the terminal 1 and the server 2.

According to an embodiment of the present disclosure, it is determined whether the data is successfully transmitted based on the response signal sent by the server 2 to the terminal 1.

According to an embodiment of the present disclosure, when the data is transmitted failed, the data is stored in the local database corresponding to the terminal 1.

According to an embodiment of the present disclosure, the terminal 1 and the server 2 are triggered periodically to connect with each other. Then the data stored in the local database is transmitted to the server 2.

According to an embodiment of the present disclosure, the data transmission method further includes the following blocks:

Transmitting the data and the identity information from the terminal 1 to the server 2;

Generating a response signal based on the identity information; and

Sending the response signal to the terminal 1. If the terminal 1 does not receive the response signal corresponding to the data, then the data is deemed to be transmitted failed.

Figure 4:
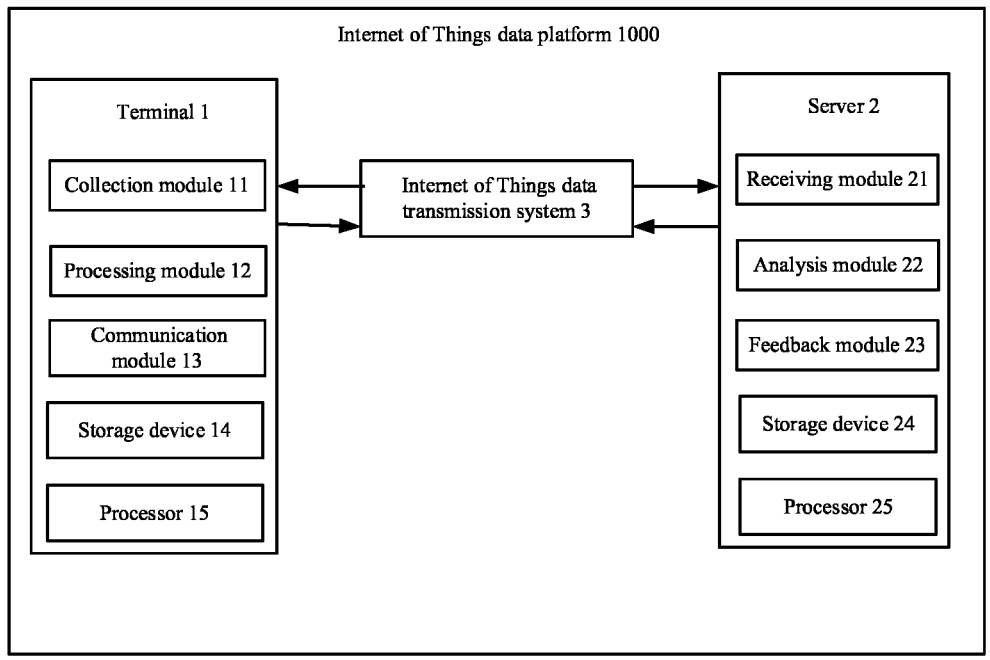
FIG. 4 is a schematic diagram of an Internet of Things platform according to a preferred embodiment of the present disclosure.

According to another aspect of the present disclosure, referring to FIG. 4, the present disclosure provides a terminal 1. The terminal 1 includes a collection module 11, a processing module 12, and a communication module 13. The word "module" as used herein, refers to logic embodied in hardware or firmware, or to a collection of software instructions, written in a programming language, such as, for example, Java, C, or assembly. One or more software instructions in the function modules may be embedded in firmware. It will be appreciated that the function modules may include connected logic modules, such as gates and flip-flops, and may include programmable modules, such as programmable gate arrays or processors. The function module described herein may be implemented as either software and/or hardware modules and may be stored in a storage device.

In one embodiment, the terminal 1 further includes, a storage device 14, and at least one processor 15. The at least one processor 15 is used to execute a plurality of modules (e.g., the collection module 11, the processing module 12, and the communication module 13 shown in FIG. 4) and other applications, such as an operating system, installed in the terminal 1. The storage device 14 stores the computerized instructions of the plurality of modules, and one or more programs, such as the operating system and applications of the terminal 1. The storage device 14 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

The collection module 11 collects the data, and the processing module 12 processes the data to obtain the data and the identity information that meet requirements. The communication module 13 transmits the data and the identity information to the server 2. The collection module 11 is communicably connected to the processing module 12 and the communication module 13. The processing module 12 is communicably connected to the communication module 13.

According to another aspect of the present disclosure, referring to FIG. 4, the present disclosure provides a server 2, the server 2 includes a receiving module 21, an analysis module 22, and a feedback module 23. The word "module" as used herein, refers to logic embodied in hardware or firmware, or to a collection of software instructions, written in a programming language, such as, for example, Java, C, or assembly. One or more software instructions in the function modules may be embedded in firmware. It will be appreciated that the function modules may include connected logic modules, such as gates and flip-flops, and may include programmable modules, such as programmable gate arrays or processors. The function module described herein may be implemented as either software and/or hardware modules and may be stored in a storage device.

In one embodiment, the server 2 further includes, a storage device 24, and at least one processor 25. The at least one processor 25 is used to execute a plurality of modules (e.g., the receiving module 21, the analysis module 22, and the feedback module 23 shown in FIG. 4) and other applications, such as an operating system, installed in the server 2. The storage device 24 stores the computerized instructions of the plurality of modules, and one or more programs, such as the operating system and applications of the server 2. The storage device 24 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

The receiving module 21 is used to receive the data and the identity information. The analysis module 22 generates an analysis result based on the data and the identity information. The analysis result may include response information. The response information may include the identity information. The feedback module 23 feeds back the response information to the terminal 1 based on the analysis result. The receiving module 21 is communicably connected to the analysis module 22, and the analysis module 22 is communicably connected to the feedback module 23.

Figure 5:
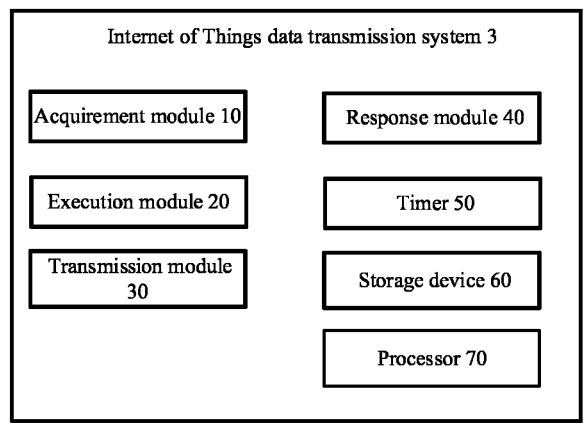
FIG. 5 is a schematic diagram of an Internet of Things data transmission system according to a preferred embodiment of the present disclosure.

According to another aspect of the present disclosure, referring to FIG. 4 and FIG. 5, the present disclosure provides an Internet of Things data platform 1000. The Internet of Things data platform 1001 includes at least one terminal 1, at least one server 2, and an Internet of Things data transmission system 3. The Internet of Things data transmission system 3 is communicably connected to the terminal 1 and the server 2, wherein the Internet of Things data transmission system 3 may include an acquirement module 10, an execution module 20, a transmission module 30, and a response module 40. The acquirement module 10 and the execution module 20 are respectively communicably connected to the transmission module 30. The response module 40 is communicably connected to the transmission module 30. The Internet of Things data transmission system 3 may be a mobile phone, a tablet computer, a personal digital assistant, a notebook computer, or other suitable computing device. The word "module" as used herein, refers to logic embodied in hardware or firmware, or to a collection of software instructions, written in a programming language, such as, for example, Java, C, or assembly. One or more software instructions in the function modules may be embedded in firmware. It will be appreciated that the function modules may include connected logic modules, such as gates and flip-flops, and may include programmable modules, such as programmable gate arrays or processors. The function module described herein may be implemented as either software and/or hardware modules and may be stored in a storage device.

In one embodiment, the Internet of Things data transmission system 3 further includes, a storage device 60, and at least one processor 70. The at least one processor 70 is used to execute a plurality of modules (e.g., the acquirement module 10, the execution module 20, the transmission module 30, and the response module 40 shown in FIG. 5) and other applications, such as an operating system, installed in the Internet of Things data transmission system 3. The storage device 60 stores the computerized instructions of the plurality of modules, and one or more programs, such as the operating system and applications of the Internet of Things data transmission system 3. The storage device 60 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

The acquirement module 10 is used to acquire the data collected by the terminal 1 and the identity information corresponding to the data. The acquirement module 10 transmits the data and the identity information to the transmission module 30, and the transmission module 30 transmits the data and the identity information to the server 2.

It is understandable that the data collected by the acquirement module 10 may be data related to the terminal 1 itself. For example, the data may be operation information of a user operating the terminal 1 that is recorded thereby. The data collected by the acquirement module 10 may also be information related to a surrounding environment of the terminal 1, for example, image information related to the surrounding environment.

The execution module 20 is communicably connected to the acquirement module 10. Based on the data obtained by the acquirement module 10, the execution module 20 processes the data based on a preset processing rule and obtains the identity information. The processing rule of the execution module 20 can be set based on the server 2. The server 2 can analyze the data and the identity information based on the preset processing rule when the data and the identity information are transmitted to the server 2.

The response module 40 is communicably connected to the server 2. The response module 40 is used to feed back the response signal of the server 2 to the terminal 1. In detail, based on the data and the identity information transmitted by transmission module 30, the server 2 can generate corresponding response signal, wherein the response signal can include the identity information, such that it is facilitate the terminal to identify. The response signal fed back to the terminal 1 by the response module 40. It can be understood that the transmission module 30 and the response module 40 may be a same signal path or different signal paths, so that an action of the transmission module 30 transmitting a signal from the terminal 1 to the server 2, and an action of the response module 40 transmitting a signal from the server 2 to the terminal 1 can be independent of each other.

Further, the Internet of Things data transmission system 3 further includes a timer 50, wherein the timer 50 can be communicably connected to the acquirement module 10 or the transmission module 30, so that the acquirement module 10 or the transmission module 30 can operate regularly. For example, the acquirement module 10 can be activated to work regularly, so the data and the identity information can be acquired regularly and transmitted to the transmission module 30. Alternatively, the transmission module 30 may be periodically activated to work, so that the data and the identity information can be regularly transmitted to the server 2.

The data and the identity information can be transmitted in a concentrated manner by the timer 50.

Further, the storage device 60 is communicably connected to the terminal 1, to store the data collected by the terminal 1. When the data is transmitted failed from the terminal 1 to the server 2, the data can be temporarily stored in the storage device 60. The acquirement module 10 is communicatively connected to the storage device 60. When the timer 50 triggers a connection between the terminal 1 and the server 2, the acquirement module 10 obtains the data from the storage device 60, and transmits the data and the corresponding identity information to the transmission module 30. The transmission module 30 transmits the data and the corresponding identity information to the server 2.

Those skilled in the art should understand that the above description and the embodiments of the present disclosure shown in the drawings are only examples and do not limit the present disclosure. The purpose of the present disclosure has been completely and effectively achieved. The function and structure principle of the present disclosure have been shown and explained in the embodiments. Without departing from the principle, the implementation of the present disclosure may have any deformation or modification.

What is claimed is:

1. An Internet of Things data transmission method, comprising:
    transmitting a plurality of data and identify information uniquely corresponding to each of the plurality of data from a terminal used to collect the plurality of data to a server, the identity information uniquely corresponding to each data comprising a unique number;
    in response to the plurality of data and the identify information uniquely corresponding to each data, generating, at the server, a response signal corresponding to each data by adding a string of characters after the identity information uniquely corresponding to each data;

feeding back, at the server, the response signal corresponding to each data to the terminal;

determining, at the terminal, which of the plurality of data are not successfully transmitted to the server by recognizing the response signal corresponding to each data;

storing, at the terminal, data transmitted failed in a local database corresponding to the terminal;

retransmitting, from the terminal, the data transmitted failed to the server; and stopping the retransmitting of the data ever transmitted failed when a number of times of retransmitting the data ever transmitted failed exceeds a certain value.

2. The Internet of Things data transmission method of claim 1, wherein the transmitting the plurality of data comprises:

processing, at the terminal, each of the plurality of data based on a preset processing rule, wherein the processing rule is determined by the server;

wherein the preset processing rule defines a filed for reporting a data number of each data, a filed for reporting a data type of each data, a filed for reporting a data entity of each data, wherein the terminal transmits each data in a real time or in a delay time based on the data type of each data.

3. The Internet of Things data transmission method of claim 1, wherein before transmitting the plurality of data, further comprises:

regularly triggering the terminal and the server to enable data transmission between the terminal and the server, wherein the plurality of data collected by the terminal is stored in a local database.

4. A terminal being communicatively connected to a server, comprising:

a storage device;

at least one processor; and the storage device storing computerized instructions, which when executed by the at least one processor, cause the at least one processor to:

collect a plurality of data, and generate identify information based on the plurality of data, the identify information being uniquely corresponding to each of the plurality of data;

transmit the plurality of data and the identity information uniquely corresponding to each data to the server, the identity information uniquely corresponding to each data comprising a unique number;

receive a response signal corresponding to each data from the sever, wherein the response signal is generated by adding a string of characters after the identity information uniquely corresponding to each data; and determine which of the plurality of data are not successfully transmitted to the server by recognizing the response signal corresponding to each data;

store data transmitted failed in a local database corresponding to the terminal;

retransmit the data transmitted failed to the server; and stop the retransmitting of the data ever transmitted failed when a number of times of retransmitting the data ever transmitted failed exceeds a certain value.

5. An Internet of Things data transmission system, being transmitting data between a terminal and a server, comprising:

a storage device;

at least one processor; and the storage device storing computerized instructions, which when executed by the at least one processor, cause the at least one processor to:

acquire a plurality of data collected by the terminal and identity information uniquely corresponding to each of the plurality of data, the identity information uniquely corresponding to each data comprising a unique number;

transmit the plurality of data and the identity information uniquely corresponding to each data to the server;

receive a response signal corresponding to each data from the sever, wherein the response signal is generated by adding a string of characters after the identity information uniquely corresponding to each data; and determine which of the plurality of data are not successfully transmitted to the server by recognizing the response signal corresponding to each data;

store data transmitted failed in a local database corresponding to the terminal;

retransmit, from the terminal, the data transmitted failed to the server;

and stop a retransmitting of data ever transmitted failed when a number of times of retransmitting the data ever transmitted failed exceeds a certain value.

6. The Internet of Things data transmission system of claim 5, wherein the at least one processor is further caused to: process the data based on a processing rule preset by the sever and generate the identity information uniquely corresponding to each data, wherein the processing rule defines a filed for reporting a data number of each data, a filed for reporting a data type of each data, a filed for reporting a data entity of each data, wherein each data being transmitted in a real time or in a delay time is determined based on the data type of each data.

7. The Internet of Things data transmission system of claim 5, further comprising:

a timer, wherein the timer is used to regularly trigger the terminal and the server to enable data transmission between each other.

* * * * *